United States Patent [19]

Mongeon

[11] 4,123,651
[45] Oct. 31, 1978

[54] APPARATUS AND METHOD FOR SPECKLE TRACKING

[75] Inventor: Robert J. Mongeon, East Longmeadow, Mass.

[73] Assignee: United Technologies Corporation, Hartford, Conn.

[21] Appl. No.: 815,611

[22] Filed: Jul. 13, 1977

[51] Int. Cl.² .............................................. G01J 1/20
[52] U.S. Cl. ................................ 250/203 R; 356/141
[58] Field of Search ..................... 356/4, 5, 141, 152; 244/3.16, 3.17; 250/203 R, 234, 235, 236

[56] References Cited

U.S. PATENT DOCUMENTS

| 3,923,395 | 12/1975 | Bodlau ................................ 356/141 |
| 4,047,816 | 9/1977 | Pell et al. ......................... 250/203 R |

*Primary Examiner*—David C. Nelms
*Attorney, Agent, or Firm*—Lawrence A. Cavanaugh

[57] ABSTRACT

A laser radar system and method for tracking speckle generated by the interaction of a beam of coherent electromagnetic radiation with a target to enhance the signal to noise ratio of a return signal is disclosed. The radar system is formed with a transceiver having a common transmit/receive optical path including beam steering mirrors capable of impressing a conical scan on a transmitted and received beam, a heterodyne circuit capable of sensing the position of a speckle maximum within the aperture of the transceiver, a peak detector capable of processing the output of the heterodyne circuit, a phase sensitive detector capable of producing a two axis discriminate proportional to the offset error of the speckle maximum and a transceiver control responsive to the two axis discriminate to provide transceiver pointing to maintain the speckle maximum within the aperture. The system results in a speckle maximum in the plane of the receiving optics and through appropriate feedback action the transmitted beam is servoed to insure that the speckle maximum remains in the aperture of the receiving optics.

17 Claims, 2 Drawing Figures

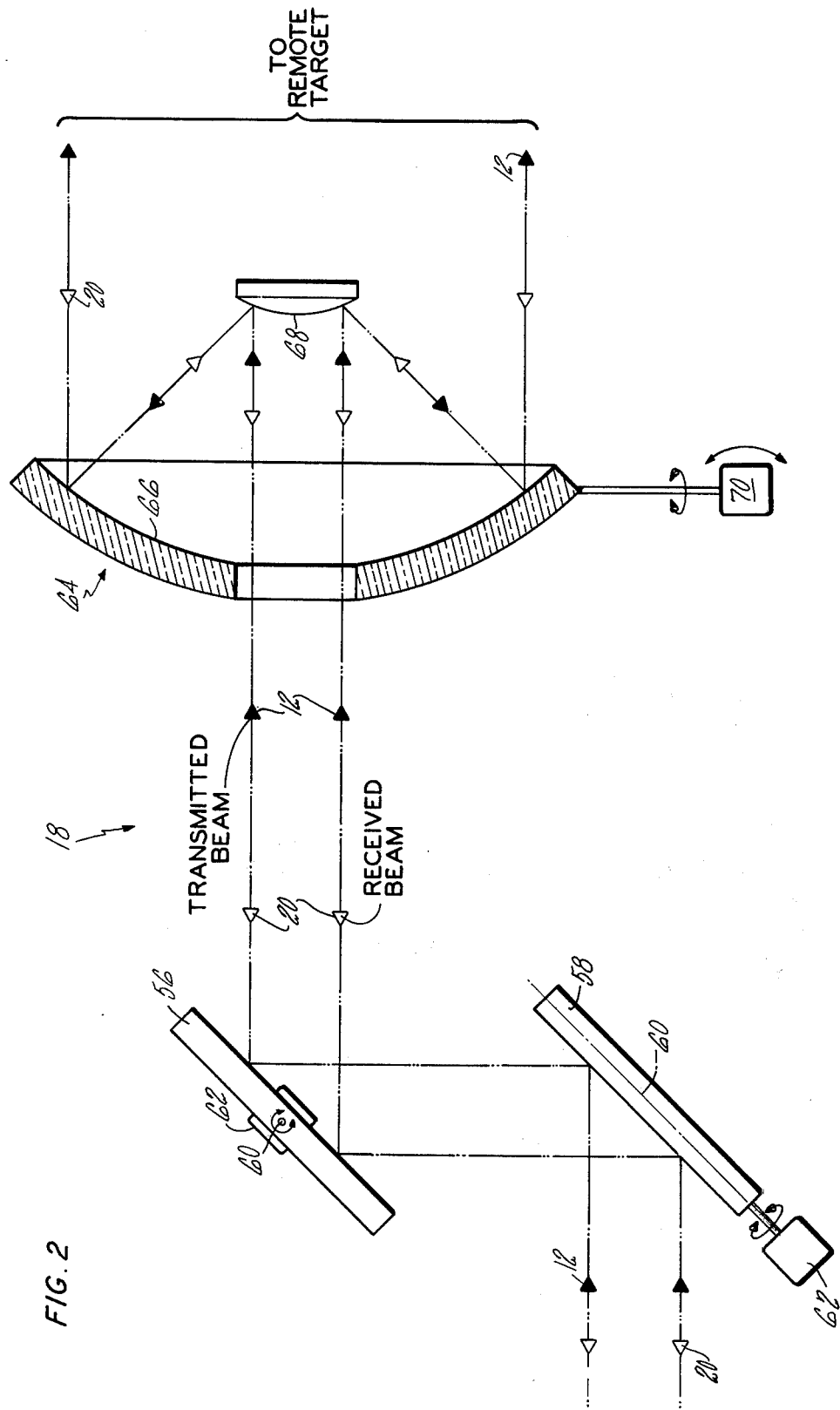

APPARATUS AND METHOD FOR SPECKLE TRACKING

The invention herein described was made in the course of or under a Contract or subcontract thereunder with the Department of the Army.

BACKGROUND OF THE INVENTION

1. Field of the Invention

The present invention relates to laser radar and more particularly to a laser radar system in which speckle tracking is employed to maximize the radar signal in the presence of degradation generated by speckle.

2. Description of the Prior Art

The operation of radar systems in which a beam of electromagnetic radiation is transmitted from a transmitter location to a remote target and reflected to a receiver location is often compromised by limitations inherent in target generated speckle. As a practical matter, the signal to noise ratio of the signal produced by the radiation reflected by the target is relatively poor due to speckle produced by the interaction of a laser beam with a target having a surface that is optically rough. This interaction limits the potential for processing the radar return signal.

Alternate approaches for minimizing the effect of the noise generated by speckle in the return signal include reducing the dimension of the receiver aperture and increasing the divergence of the transmitter so that the illuminating beam is larger than the target. Both of the above approaches have the disadvantage of requiring increased transmitter power to perform the same mission. Current adaptive optic techniques do not address the sample problem, since their objective is to maximize power on a fixed point in the target plane and are not concerned with maintaining a speckle maximum in the receiver aperture.

SUMMARY OF THE INVENTION

A primary object of the present invention is to provide a laser radar system capable of maintaining a speckle maximum within the aperture of a receiver to enhance the signal to noise ratio of a received signal.

According to the present invention a laser radar system capable of tracking speckle produced by the interaction of a laser beam with a target comprises means for providing a beam of coherent radiation, a transceiver having a common optical path for directing the beam to a target and for receiving the beam reflected from the target including a telescopic system having beam steering mirrors, means for dithering the beam steering mirrors to impress an identical conical scan on the transmitted and received beams, means for providing an electrical signal to the means for dithering the mirrors, a heterodyne circuit having an optical detector and capable of sensing a speckle maximum in the aperture of the transceiver to provide an electrical received signal, a peak detector for processing the electrical received signal to produce an output signal, a phase sensitive detector capable of processing the output signal with the electrical signal to the means for dithering the mirrors to generate a two axis discriminate having error information, and a transceiver control responsive to the two axis discriminate for maintaining a speckle maximum in the aperture of the receiver.

A primary feature of the present invention is the common transmit and receive optical path in the transceiver. Additionally, the beam steering mirrors in the common transmitter/receiver optical path of the transceiver are capable of being dithered by a sinusoidal electrical signal from a low frequency oscillator to generate a conical scan on the laser beam transmitted to the target. The beam reflected from the target is received by the transceiver and directed to an optical heterodyne circuit by the beam steering mirrors which are dithered to impress an identical conical scan on the received beam. Additionally, the conical scan on the transmitted and received beams has a magnitude small compared to the diffraction angle of the transceiver. Also, the heterodyne circuit is capable of optically mixing the received beam with a reference beam which has been frequency shifted by an acoustical-optical shifter, to produce the electrical received signal. Amplitude fluctuation of the electrical received signal produced by motion of a speckle maximum within the aperture of the transceiver are processed by the peak detector to generate the output signal proportional to the motion of the speckle maximum within the aperture. The signal from the low frequency oscillator to the means for dithering the beam steering mirrors is also simultaneously passed to the phase sensitive detectors to supply a forcing function which, when mixed with the output signal of the peak detector, produces a two axis discriminate whose amplitude and phase is proportional to the magnitude and direction of any adjustment required to track the speckle. A transceiver control, responsive to the two axis discriminate, is capable of adjusting the azimuthal and zenith pointing of the telescope to maintain a speckle maximum in the plane of the aperture of the transceiver. The closed loop operation results in minimizing the amplitude modulation of the electrical received signal and tracks the speckle. For perfect alignment of the telescope with the target, the speckle traverses about the geometric center of the reference beam within the heterodyne circuit and vanishingly small amplitude fluctuations of the electrical received signal are generated. The amplitude fluctuations of the electrical received signal increases when the speckle is not axially aligned with the reference beam.

A primary advantage of the present invention is that the diameter of the transmitted beam can be smaller than the target, to increase the resolution of the radar system without suffering from increased speckle modulation. The freedom from speckle modulation also enables more precise signal processing to be employed in analyzing the radar return. This can manifest itself in superior tracking or Doppler performance.

The foregoing and other objects, features and advantages of the present invention will become more apparent in the light of the following detailed description of preferred embodiment thereof as illustrated in the accompanying drawing.

BRIEF DESCRIPTION OF THE DRAWING

FIG. 2 is a simplified schematic of some of the details of the transceiver within the tracking system.

DESCRIPTION OF THE PREFERRED EMBODIMENTS

Figure 1:
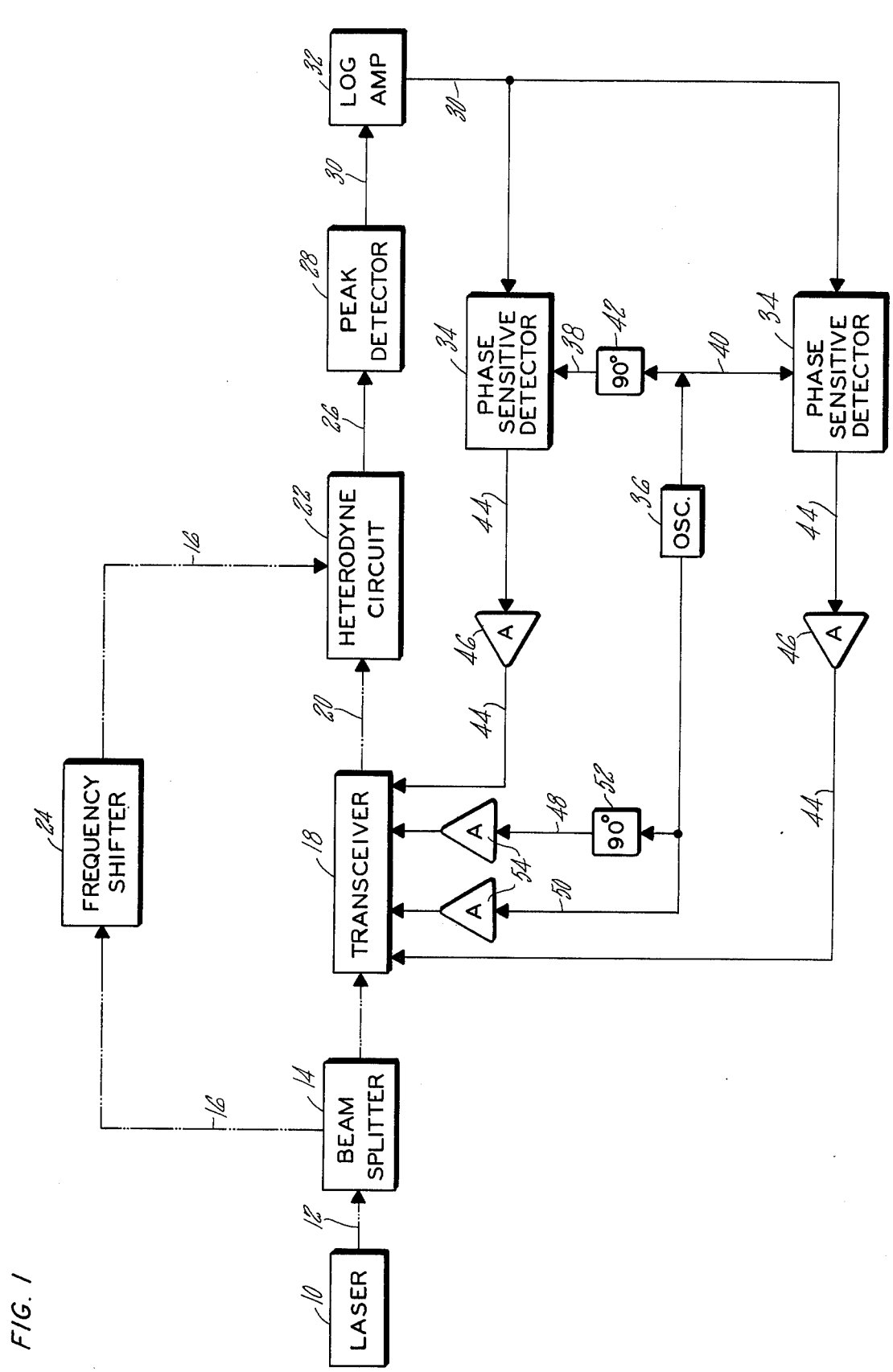
FIG. 1 is a simplified schematic of the present invention showing the major elements of a tracking system.

The apparatus shown in FIG. 1 is a simplified schematic of the present invention as applied to a device for tracking a moving target. A source 10 of coherent electromagnetic radiation such as a laser provides a beam 12 to a beam splitter 14 which reflects a portion of the beam to form a reference beam 16 with the major portion of the beam passing to a transceiver 18. The beam is transmitted by the transceiver to a remote target (not shown) which reflects a portion of the beam back to the transceiver to form a received beam 20 which passes to a heterodyne circuit 22 where it mixes with the reference beam 16 which has been frequency shifted by a shifter 24. The transceiver is described in further detail hereinafter. An electrical received signal 26 produced by the heterodyne circuit is directed into a detector 28 capable of sensing amplitude fluctuations of the electrical received signal to generate an output signal 30. The output signal is amplified by a logrithmic amplifier 32 and passes through phase sensitive detectors 34. A low frequency oscillator 36 provides reference signals 38, 40, which are made 90° out of phase with one another by a first phase shifter 42 to the phase sensitive detectors. Discriminates 44, produced by the phase sensitive detectors, are amplified by amplifiers 46, and govern the corrections provided to the variable control parameters within the transceiver. In addition, the low frequency oscillator 36 provides electrical signals 48, 50, which are made 90° out of phase with one another by a second phase shifter 52 and amplified by second amplifiers 54, to the transceiver for providing a conical scan to the transmitted and received beams as hereinafter described.

FIG. 2 shows some of the details of the laser transceiver shown in FIG. 1. The transceiver 18 comprises a first beam steering mirror 56 and a second beam steering mirror 58, each of which has an axis of rotation 60, co-planer and perpendicular to one another, a dither drive 62, a cassegrainian type telescope 64 having a concave mirror 66 and a convex mirror 68, and a transceiver pointing control 70.

In operation the laser 10 provides the beam 12 incident onto the beam splitter 14 where a small portion is reflected as reference beam 16 for use in the heterodyne circuit as hereinafter described. The majority of the beam 12 passes through the beam splitter to the transceiver 18 where it is directed by the beam steering mirrors to the cassegrainian type telescope. The convex mirror 68 expands the beam to the concave mirror 66 which transmits the beam to the remote target (not shown). The first beam steering mirror 56 and the second beam steering mirror 58 are rotationally dithered about their respected axis by dither drive 62. Each of the dither drives are controlled by sinusoidal electrical drive signals from the low frequency oscillator 36, made 90° out of phase from one another by the second phase shift 52, to impress a conical scan on the transmitted beam. The sinusoidal electrical drive signals have a frequency typically four to ten times greater than the highest frequency being tracked and are capable of generating a scan having a magnitude which is a small fraction of the telescope diffraction angle, typically 5 percent. The highest frequency being tracked is proportional to the frequency of speckle motion within the aperture.

The transmitted beam passes through the transceiver and is incident onto the remote target which typically has dimensions larger than the diameter of the transmitted beam. The beam interacts with the surface of the target and a portion is reflected to the concave mirror 66 in the aperture of the telescope within the transceiver to form the received beam 20 which is directed to the heterodyning circuit by the beam steering mirrors. When the target granularity is comparable to the wavelength of the impinging radiation, which is almost always the case, the reflected radiation is scattered according to Lambert's law, that is, the intensity is a cosine function of the surface normal. For monochromatic sources such as some laser beams, an additional fine structure called optical speckle is observed. The optical speckle is a random distribution of the interferometric summation of the radiation emanated from a statistical array of point source radiation, i.e., the surface of a diffuse target. Since the speckle results from the statistical array of point source radiators, the speckle distribution can only be described in statistical quantities. However, on average, each speckle will have a diameter equal to the size of the aperture of the transceiver and for the stationary situation in which there are no atmosphere perturbations, target motions, or transceiver pointing instabilities, the intensity and relative phase of the speckle in the plane of the aperture of the telescope is spatially constant and will heterodyne efficiently when mixed with a sample of the original radiation.

The optimum condition of the present invention is to have a single speckle in the aperture of the receiver. This condition can be satisfied if the angular resolution of the receiver is equal to or less than the angular resolution of the transmitter. For the common transmitting-/receiving telescope configuration herein referred to as the transceiver, the receiving aperture is always optimum and on the average will contain one speckle. In practice, the statistical nature of the speckle pattern is such that there is no guarantee that an average speckle is always in the receiving aperture, that it is centered in the aperture, or that only one speckle is in the aperture. In fact, when more than one speckle is in the aperture, the instantaneous phase relationship of adjacent speckles is random and conceivably can heterodyne with the reference beam to produce a zero detected signal. However, speckles are, on average, angularly separated from one another by the diffraction angle of the transmitting telescope. Hence, any relative angular motion comparable to or greater than the diffraction angle will cause the speckles to move across the aperture of the receiver. Since the spatial position of the speckle on the target is constant, any movement of the speckle across the aperture will be the result of the relative motion between the target and the transceiver.

For the situation in which the transceiver is stationary, target motion will result in speckle movement within the aperture. The heterodyne circuit is capable of mixing the moving speckle with the reference beam to produce an electrical signal having fluctuations with amplitude and phase characteristics capable of being demodulated to provide information to control the zenith and azimuthal pointing of the transceiver to maintain a speckle maximum in the aperture of the transceiver and thus track the target. Simply stated the present invention results in a speckle maximum in the plane of the receiving optics and through appropriate feedback action, the transmitted beam can be servoed to insure that a speckle maximum will always be in the receiver aperture. A speckle maximum in the aperture of the receiving optics results in the minimunization of the fluctuations in the received signal thereby improving the signal to noise ratio of the received signal. It is important to note that the action of stabilizing the speckle maximum at the center of the aperture does not imply that the transmitted radiation is stabilized on the target, such as is the intent of adaptive type tracking systems. In contradistinction the present invention is more likely to keep moving the transmitted beam over the target so as to maintain a return speckle maximum in the transceiver aperture despite the presence of target motion or atmospheric-perturbations.

In operation, the reflected beam having speckle is collected in the aperture of the transceiver as the received beam and is directed to the heterodyne circuit by the beam steering mirrors which are dithered to impress a conical scan on the received beam to deconvolute the conical scan impressed on the transmitted beam. The heterodyne circuit optically mixes the received beam with the reference beam 16, typically having a wavefront of a plane wave, which has been frequency shifted by a shifter 24 such as an acoustical optical device. The heterodyned beam incident onto a photo detector (not shown) produces the electrical received signal 26 having fluctuations produced by the motion of the speckle maximum in the plane of the aperture of the transceiver. The efficiency of the optical heterodyning is dependent on the wave front matching of the received and reference beams. For perfect alignment of the received beam with the reference beam within the heterodyne circuit, the speckle traverses about the geometric center of the reference beam. If the speckle maximum is in the center of the aperture, then the small angular scan common to both the transmitted and received beams has vanishingly small perturbation to the heterodyne efficiency and vanishingly small fluctuations of the electrical received signals are generated at the scanning frequency. As the speckle maximum moves off center, the speckle is not as efficiently heterodyned and the conical scanning results in generating increased fluctuations of the electrical received signal.

The detector 28 processes the fluctuation of the electrical received signal to provide the output signal to the phase sensitive detector 34. The electrical signal provided to the dither drives on the beam steering mirrors is also simultaneously supplied to the phase sensitive detectors to provide a forcing function at the scanning frequency which, when synchronously processed with the output of the peak detector produces the direct current, two axis discriminate having phase information proportional to the direction of the tracking error and amplitude information proportional to the magnitude of the tracking error. The two axis discriminate provides the electrical signal to the transceiver pointing control 70 which directs the azimuthal and zenith pointing of the transceiver to track the target to maintain the speckle maximum at the center of the aperture to maximize the signal generated by the radar system while minimizing signal degradation produced by the fluctuations of the electrical received signal resulting from speckle wandering through the aperture.

While the preferred embodiment is described in terms of a transceiver, the apparatus will function equally well with a separate transmitter and receiver. However, both the transmitted and received beams must have a conical scan with identical scan frequencies and magnitude. The same apparatus is also descriptive of a system in which the transmitter broadcasts to a receiver at a distant location in which case the error signals are fed back from the distant location to the transmitter by separate means. Additionally, the azimuthal and zenith pointing of the transceiver may be accomplished by the beam steering mirrors.

Although this invention has been shown and described with respect to preferred embodiments thereof it should be understood by those skilled in the art that various changes and omissions in form and detail thereof may be made therein without departing from the spirit and scope of the invention.

Having thus described a typical embodiment of my invention, that which I claim as new and desire to secure by Letters Patent of the United States is:

1. A system for tracking a target utilizing optical speckle produced by the interaction of a beam of electromagnetic radiation with a surface of the target to improve the signal to noise ratio of a received signal comprising:

means for providing a beam of coherent electromagnetic radiation;

means for separating the beam into a reference beam and a transmitted beam;

a transceiver having a telescopic system with an aperture for directing the transmitted beam to a target and for collecting a beam reflected from the target to provide a received beam including, means for directing the transmitted beam to the telescopic system and for directing the received beam to a heterodyne circuit wherein the transmitted and received beam have a common optical path within the transceiver, and means for dithering the means for directing the transmitted and received beams to impress an identical conical scan on the transmitted and received beams;

a heterodyne circuit capable of heterodyning the received beam with the reference beam to provide an electrical received signal proportional to the intensity of the received beam, the conically scanned speckle within the received beam traverse about the geometric center of the reference beam generating fluctuations in the electrical received signal having amplitude and phase characteristics proportional to the position of the speckle within the aperture of the transceiver;

detection means for processing the fluctuations of the electrical received signal to produce an output signal;

a phase sensitive detector responsive to the output signal;

means for providing an electrical signal to the phase sensitive detector to provide a forcing function for processing the output signal to obtain a two axis discriminate having error signals proportional to the position of a speckle maximum in the aperture of the transceiver and for providing an electrical signal to the means for dithering the means for directing the transmitted and received beams; and a transceiver pointing control responsive to the two axis discriminate for directing the azimuthal and zenith pointing of the transceiver to maintain the speckle maximum in the plane of the aperture of the transceiver to minimize the fluctuations of the electrical received signal to improve the signal to noise ratio of the received signal.

2. The invention in accordance with claim 1 wherein the means for providing an electrical signal to the means for dithering the means for directing the transmitted and received beams is a low frequency oscillator.

3. The invention in accordance with claim 2 wherein the low frequency oscillator provides the electrical signal with a frequency 4 to 10 times greater than the highest frequency being tracked.

4. The invention in accordance with claim 1 wherein the conical scan impressed on the transmitted and received beam has a magnitude which is a small fraction of the diffraction angle of the transceiver.

5. The invention in accordance with claim 4 wherein the magnitude of the conical scan is no larger than 5 percent of the diffraction angle of the transceiver.

6. The invention in accordance with claim 1 wherein the means for directing the transmitted and received beam comprises:
   a first beam steering mirror having a first axis of rotation, and
   a second beam steering mirror having a second axis of rotation coplanar and perpendicular to the first axis of rotation.

7. The invention in accordance with claim 6 further including a first phase shifter capable of making the electrical signal provided to the means for dithering the first beam steering mirror 90° out of phase with the electrical signal provided to the means for dithering the second beam steering mirror.

8. The invention in accordance with claim 1 wherein the heterodyne circuit further includes a shifter capable of frequency shifting the reference beam.

9. The invention in accordance with claim 8 wherein the shifter is an acoustical-optical device.

10. The invention in accordance with claim 1 wherein the reference beam has a wave front in the configuration of a plane wave.

11. The invention in accordance with claim 1 wherein the transceiver pointing control responsive to the two axis discriminate is the means for directing the transmitted and received beam.

12. A method of tracking speckle produced by the interaction of a beam of electromagnetic radiation with a surface of a target to improve the signal to noise ratio of a received signal comprising in combination the steps of:
   providing a beam of coherent electromagnetic radiation;
   separating the beam of electromagnetic radiation into a reference beam and a transmitted beam;
   directing the transmitted beam to a transceiver having beam steering mirrors capable of being dithered;
   dithering the beam steering mirrors with an electrical signal from a low frequency oscillator to impress a conical scan on the transmitted beam;
   directing the transmitted beam having the conical scan through an aperture in the transceiver to a remote target;
   interacting the beam with the surface of the target to produce a reflected beam having the conical scan and speckle produced by the interferometric summation of the radiation reflected from the target;
   collecting the reflected beam in the aperture of the transceiver to provide a received beam incident on the beam steering mirrors;
   dithering the beam steering mirrors to impress a conical scan on the received beam to deconvolute the concial scan impressed on the transmitted beam;
   directing the received beam to a heterodyne circuit;
   heterodyning the receiving beam with the reference beam to provide an electrical received signal proportional to the intensity of the received beam, the conically scanned speckle within the received beam traverse about the geometric center of the reference beam generating fluctuations in the electrical received signal having amplitude and phase characteristics proportional to the position of the speckle within the aperture of the transceiver;
   processing the fluctuations of the electrical received signal with detection means to produce an output signal;
   providing an electrical signal from the low frequency oscillator to a phase sensitive detector wherein the electrical signal provided to the phase sensitive detector has amplitude and phase characteristics identical to the electrical signal provided to the beam steering mirrors;
   synchronously processing the output signal and the electrical signal from the low frequency oscillator with the phase sensitive detector to generate a two axis discriminate having amplitude and phase characteristics directly proportional to the amount and direction of motion of a speckle maximum within the aperture of the transceiver; and
   controlling the azimuthal and zenith pointing of the transceiver with a transceiver pointing control responsive to the axis discriminate to maintain the speckle maximum in the aperture of the transceiver to minimize fluctuations of the electrical received signal from speckle wandering through the aperture of the transceiver to obtain a received signal having an improved signal to noise ratio.

13. The invention in accordance with claim 12 wherein the conical scan is impressed on the transmitted and received beam with a scan magnitude small compared to the diffraction angle of the transceiver.

14. The invention in accordance with claim 13 wherein the magnitude of the conical scan is no larger than 5 percent of the diffraction angle of the transceiver.

15. The invention in accordance with claim 12 including the additional step of shifting the frequency of the reference beam with an acoustical-optical device.

16. A system for tracking a target utilizing optical speckle produced by the interaction of a beam of electromagnetic radiation with a surface of the target to improve the signal to noise ratio of a received signal comprising:
   means for providing a beam of coherent electromagnetic radiation;
   means for separating the beam into a reference beam and a transmitted beam;
   a transmitter for directing the beam to a target including,
      beam steering mirrors for directing the transmitted beam through the transmitter, and
      a telescopic system having an aperture for passing the beam to the target;
   a receiver for collecting the beam reflected from the target to provide a received beam having optical speckle produced by the interaction of the transmitted beam with the surface of the target including,
      a telescopic system having an aperture for collecting the beam reflected by the target, and
      beam steering mirrors for passing the received beam from the telescopic system to the heterodyne circuit;
   means for dithering the beam steering mirrors in the transmitter and receiver to impress identical conical scans on the transmitted and received beams;
   means for providing an electrical signal to the means for dithering the beam steering mirrors;

- a heterodyne circuit capable of heterodyning the reference beam with the received beam to provide an electrical received signal proportional to the intensity of the received beam, the conically scanned speckle within the received beam traverse about the geometric center of the reference beam generating fluctuations in the electrical received signal having amplitude and phase characteristics proportional to the position of the speckle within the aperture of the receiver;
- detection means for processing the fluctuations of the electrical received signal to produce an output signal;
- a phase sensitive detector responsive to the output signal;
- means for providing an electrical signal to the phase sensitive detector to provide a forcing function capable of demodulating the output signal to provide a two axis discriminate having error signals proportional to the position of the speckle maximum in the aperture of the receiver and for providing an electrical signal to the means for dithering the beam steering mirrors; and
- a transceiver pointing control responsive to the two axis discriminate capable of controlling the azimuthal and zenith pointing of the transmitter to maintain the speckle maximum in the plane of the aperture of the receiver to maximize the signal generated by the tracking system while minimizing the signal degradation resulting from fluctuations of the electrical received signal produced by speckle wandering through the aperture of the receiver.

17. The invention in accordance with claim 16 wherein the transmitter and the receiver are located distant from one another.

* * * * *

UNITED STATES PATENT AND TRADEMARK OFFICE
CERTIFICATE OF CORRECTION

PATENT NO. : 4,123,651
DATED : October 31, 1978
INVENTOR(S) : Robert J. Mongeon

It is certified that error appears in the above-identified patent and that said Letters Patent are hereby corrected as shown below:

Column 7, claim 12, line 62: "receiving" should read --received--

Signed and Sealed this

Twentieth Day of February 1979

[SEAL]

Attest:

RUTH C. MASON
*Attesting Officer*

DONALD W. BANNER
*Commissioner of Patents and Trademarks*